T. F. MULLIGAN.
QUANTITY SETTING CLUTCH MECHANISM.
APPLICATION FILED APR. 21, 1913.
1,171,628.
Patented Feb. 15, 1916.
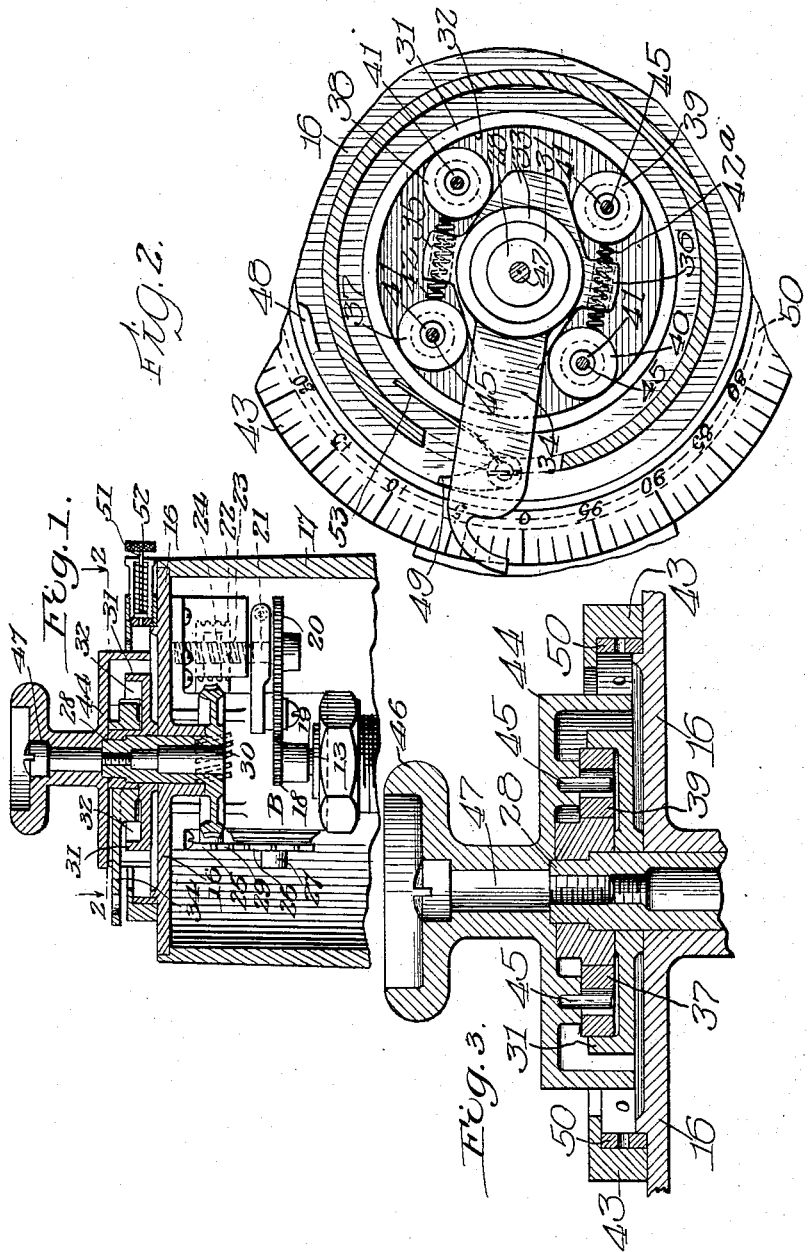

UNITED STATES PATENT OFFICE.

THOMAS F. MULLIGAN, OF FORT WAYNE, INDIANA, ASSIGNOR TO S. F. BOWSER & COMPANY, INCORPORATED, OF FORT WAYNE, INDIANA.

QUANTITY-SETTING CLUTCH MECHANISM.

1,171,628.   Specification of Letters Patent.   Patented Feb. 15, 1916.

Application filed April 21, 1913. Serial No. 762,529.

*To all whom it may concern:*

Be it known that I, THOMAS F. MULLIGAN, a citizen of the United States, residing at Fort Wayne, in the county of Allen and State of Indiana, have invented certain new and useful Improvements in Quantity-Setting Clutch Mechanisms, of which the following is a specification.

This invention relates to quantity setting clutch mechanisms, and is in the nature of an improvement upon the quantity setting mechanisms disclosed in my application, Serial Number 439,397, filed in the United States Patent Office, June 19, 1908, and my application, Serial Number 602,826, filed in the United States Patent Office, January 16, 1911.

This invention has for its primary object the provision of an improved quantity setting clutch mechanism which shall have improved means for operatively connecting a rotatable indicator with a rotating member actuated by a meter.

With the above and other objects in view, this invention consists substantially in the construction, combination and arrangement of parts, all as hereinafter more fully described, claimed, and illustrated in the accompanying drawings which form a part of this specification and show the preferred embodiment of my invention.

In the drawings Figure 1 is a sectional view of the clutch mechanism constructed in accordance with the principles of my invention. Fig. 2 is a plan view of a portion of the clutch mechanism partly in side elevation and partly in section, and Fig. 3 is an enlarged sectional view of a portion of the mechanism.

Briefly stated, this invention comprises a clutch mechanism for an indicator arm, by means of which the arm will be moved in either direction by a rotating part with a setting device, by means of which the clutch may be released for moving the arm freely in either direction. It was designed and intended for use in connection with a combined meter and valve mechanism of the type shown in the patent above mentioned, but of course may have a more general application.

The main frame of my invention is a circular plate 16 supported in its proper position by attachment to an auxiliary casing 17.

The letter B in Fig. 1 indicates generally any ordinary registering device, which is actuated by power from a meter shaft 13 carried through a pinion 18, an idler gear 19, a gear wheel 20, a shaft 21, a worm 22, a worm gear 23, a shaft 24, a Geneva escapement pinion 25, and a Geneva escapement wheel 26 fixed upon an operating shaft 27 of the registering device. A driving shaft 28, centrally journaled within the plate 16, bears at its inner end and secured upon it a worm gear 29 which engages a worm 30 upon the shaft 24. Fixed upon the shaft 28 and concentric therewith is a cup 31 having an inner peripheral friction surface 32. Rotatably and concentrically mounted upon the driving shaft 28 and disposed within the cup 31 to form four segmental spaces therein, is a diamond-shaped cam 33 bearing an indicator arm 34 and having apertured lugs 35 and 36 formed upon its sides. Four friction rollers 37, 38, 39 and 40, centrally bored as at 41, lie within the segmental spaces in the cup 31 and have their friction surfaces in contact on one side with the friction surface 32 of the cup, and in contact on the other side with the friction surfaces of the diamond-shaped cams. A compression spring member 42 is interposed between the friction rollers 37 and 38 and holds them in the above mentioned position, and a similar spring member 42ª interposed between the friction rollers 39 and 40 holds them also in the above described position. The spring member 42 is held from lateral motion by insertion in the aperture of the lug 35 and similarly spring member 42ª is held from lateral motion by insertion in the aperture of the lug 36. The friction surfaces of the diamond-shaped cam are disposed at such an angle that rotation of the cup 31 in either direction serves to increase the friction of two diagonally opposite rollers between the cup and the adjacent cam surfaces, thereby locking the cam and the indicator arm 34 into fixed relation with the cup 31 and the shaft 28. Sufficient room is allowed for limited movement of the rollers out of frictional contact with the cam and the cup by movement of any one of them against the force of its compression spring and in the direction of the adjacent lug. By moving any diagonally opposite pair of the friction rollers toward their respective adjacent lugs the diamond-shaped cam 33 and the indicator arm 34 may be turned upon the shaft 28 as a pivot to cause the indicator arm to register with any one of a series of graduations upon an annular dial 43 concentric with the shaft 28, secured upon the outer surface of the plate 16, and preferably of greater diameter than the cup 31. Means for manually causing this independent rotation of the indicator arm 34 is provided in a circular cover 44 concentric upon the shaft 28 and disposed about the cup 31, and bearing upon its inner surface four studs 45 of a diameter smaller than, and adapted to engage the bores 41 of the friction rollers. Upon the outer surface of the cover 44 is formed a handle 46, centrally bored to receive a shouldered machine bolt 47 threaded at its inner end for engagement with the tapped outer end of the shaft 28. The cover 44 is manually operable independently of the shaft 28 for the purpose of causing the indicator arm to register with any one of the graduations upon the annular dial 43. Ordinarily the graduations upon the annular dial 43 are used to indicate gallons of liquid passing through the registering meter, and they preferably begin with zero and end with 100; the same graduation indicating zero or 100.

In the operation of this invention when it is desired to pass a predetermined number of gallons of liquid through the registering meter, 15 gallons for instance, the operator grasps the handle 46 of the cover 44 and turns it to cause the indicatior arm to register with the graduation 15 upon the annular dial 43. The indicator arm may be turned in this manner in either direction but preferably the operator causes it to move through the shortest arc of a circle to reach the desired graduation, consequently if the operator were setting the indicator arm from the position shown in Fig. 2, he would turn it in the direction ordinarily traveled by the hands of a clock from the position adjacent the graduation at which the arm is shown to a position where the arm would register with the graduation 15. As the handle 46 is turned in this manner the studs 45 of the cover 44, which are of a somewhat smaller diameter than the bores 41 of the friction rollers, will cause the friction rollers 37 and 39 to move out of frictional contact with the diamond-shaped cam 33 and the cup 31, against the pressure of their respective spring members 42 and 42$^a$, and toward their respective lugs 35 and 36. The pressure thus exerted upon the friction rollers 37 and 39 is conveyed through the spring members 42 and 42$^a$ against the friction rollers 38 and 40 causing them, by pressure against their respective cam surfaces, to drive the diamond-shaped cam and indicator arm in the above described direction. When the indicator arm registers with the graduation 15, the operator releases his grasp of the handle 46 and starts a flow of liquid through the registering meter. As previously described, the power of the meter shaft 13 is carried to the driving shaft 28, to which is secured the cup 31. The rotation of the cup 31 in a counter-clockwise direction causes the indicator arm to travel in the same direction or from the graduation 15 on the annular dial toward the graduation zero, the indicator arm covering the distance between two adjacent graduations for every gallon of liquid passing through the meter. This motion is caused by the binding of the friction rollers 37 and 39 between the cup 31 and the diamond-shaped cam 33.

Frequently in making batches wherein the same amount of liquid is used for every batch, it is desired to pump consecutively, and for a great number of times, the same amount of liquid, and for convenience in setting the indicator arm at the desired graduation quickly, an adjustable stop 48 is provided, adapted to coöperate with a pawl 49 carried preferably on the under side of the indicator arm 34. The stop 48 is formed on the inner periphery of a ring 50 rotatably mounted within the inner periphery of the dial 43, the dial being channeled to receive the ring. The ring 50 is radially bored, preferably at points corresponding to multiples of five gallons, upon the annular dial 43. A spring-pressed lock bolt 51, preferably provided with a knurled head 52, is adapted to engage any desired radial hole of the ring 50. A spring member 53 set in the pawl 49, and having its free end in contact with the outer periphery of the cup 31, serves to hold the pawl 49 at all times in contact with the inner periphery of the ring 50. In operation, when it is desired to measure consecutively the same number of gallons of liquid, for instance 15 gallons, the indicator arm 34 is manually moved clockwise until the pawl 49 contacts with the stop 48. When the meter shaft 13 is actuated, the flow of liquid is begun through the registering meter, and the indicator arm moves counter-clockwise toward the graduation zero. Should it be desired to measure off a series of quantities of liquid of a different number of gallons, 20 for instance, the lock bolt 51 is drawn from its engagement with the ring 50, the ring 50 is moved until the stop 48 is in such position that contact between it and the pawl 49 will cause the indicator arm to register with the graduation 20 upon the annular dial, when the lock bolt 51 is re-inserted in that radial hole of the ring 50 which then registers with it. Obviously the ring 50 might be radially bored with one hole for every graduation upon the annular dial, but in practice such a great number of radial bores in the ring 50 is not necessary.

I claim:

1. Quantity setting clutch mechanism comprising a rotating member, a rotatable member concentric therewith, a friction cup fixed to the rotating member, a cam upon the rotatable member, centrally bored friction rollers disposed between the cup and the cam for locking the rotating member and the rotatable member into fixed relation, and a rotatable cover having studs to directly engage in the bores of the rollers for moving some of them into and others out of locking position.

2. Quantity setting clutch mechanism comprising a rotating member, a rotatable member concentric therewith, a friction cup secured to the rotating member, a cam upon the rotatable member, sets of adjustable centrally bored friction rollers disposed between the cup and the cam locking the rotating member and the rotatable member into fixed relation, and a rotatable cover having studs to engage in the bores of the rollers for simultaneously engaging one set and disengaging the other from locking relation depending upon the direction of rotation of the cover.

3. Quantity setting clutch mechanism comprising a rotating member, a rotatable member concentric therewith, a friction cup concentrically secured to the rotating member, a cam secured to the rotatable member and disposed within the friction cup, centrally bored friction rollers disposed between the friction cup and the cam for locking the rotating member and the rotatable member into fixed relation, and a rotatable cover having studs loosely fitting the bores of the rollers to move the rollers out of frictional engaging position.

4. Quantity setting clutch mechanism comprising a rotating member, a rotatable member concentric therewith, an annular friction cup concentrically secured to the rotating member, a cam secured to the rotatable member and disposed within the friction cup, centrally bored friction rollers disposed between the friction cup and the cam for locking the rotating member and the rotatable member into fixed relation, spring members disposed between pairs of the rollers to hold them in operative contact with the friction cup and the cam, and a cover carried by the rotating member having studs to directly but loosely engage in the bores of the rollers for moving some of the rollers out of clutching engagement by means of which the rotatable member is set in either direction with respect to the rotating member.

5. Quantity setting clutch mechanism comprising a rotating member, a rotatable member, an annular friction cup concentrically secured to the rotating member, a diamond-shaped cam concentrically secured to the rotatable member and disposed within the friction cup, apertured lugs upon the diamond-shaped cam adjacent the obtuse angles thereof, four centrally bored friction rollers disposed between the friction cup and the diamond-shaped cam for locking the rotating member and the rotatable member into fixed relation, spring members passing through the apertured lugs and disposed between pairs of the rollers to hold the rollers normally in operative contact with the friction cup and the diamond-shaped cam, and a cover carried by the rotating member having studs to engage loosely in the roller bores, the cover being rotatable in both directions and operative to engage the rollers to move one of each pair into clutching contact and the other one out of such contact for setting the rotatable member in one direction or the other with respect to the rotating member depending on the direction the cover is rotated.

6. Quantity setting mechanism comprising a rotating member, a rotatable member concentric therewith, an annular friction cup concentrically secured to the rotating member, a diamond-shaped cam concentrically secured to the rotatable member and disposed within the friction cup, four centrally bored friction rollers disposed between the friction cup and the diamond-shaped cam locking the rotating member and the rotatable member into fixed relation, and means for oscillating the rotatable member with relation to the rotating member comprising a handle, and four studs protruding from the handle and disposed within the central bores of the friction rollers.

7. Quantity setting mechanism comprising a rotating member, a rotatable member concentric therewith, an annular friction cup concentrically secured to the rotatable member, a diamond-shaped cam concentrically secured to the rotatable member and disposed within the friction cup forming four equal spaces, four centrally bored friction rollers of a diameter smaller than the greatest width of the spaces each disposed within one of the spaces and in contact with the friction cup and the diamond-shaped cam and locking the rotating member and the rotatable member into fixed relation, two spring members each interposed between a pair of the friction rollers to hold them in locking position, and means for moving either pair of diagonally opposite rollers out of locking position and oscillating the rotatable member with relation to the rotating member comprising a handle, and four studs protruding therefrom of smaller diameter than the bores of the friction rollers and disposed within the bores of the friction rollers.

8. Quantity setting mechanism comprising a rotating member, a rotatable member concentric therewith, an annular friction cup concentrically secured to the rotating member, a diamond-shaped cam concentrically secured to the rotatable member and disposed within the friction cup forming four equal segmental spaces, four centrally bored friction rollers of a diameter smaller than the greatest width of the segmental spaces each disposed within one of the segmental spaces and in contact with the friction cup and the diamond-shaped cam and locking the rotating member and the rotatable member into fixed relation, two spring members each interposed between a pair of the friction rollers to hold them in locking position and oscillating the rotatable member with relation to the rotating member comprising a handle, and four studs protruding therefrom of smaller diameter than the bores of the friction rollers and disposed within the bores of the friction rollers.

9. Quantity setting mechanism comprising a rotating member, a rotatable member concentric therewith, an annular friction cup concentrically secured to the rotating member, a diamond-shaped cam concentrically secured to the rotatable member and disposed within the friction cup forming four equal segmental spaces, two apertured lugs protruding from the diamond-shaped cam at the obtuse angles thereof, four centrally bored friction rollers of a diameter smaller than the greatest width of the segmental spaces each disposed within one of the segmental spaces, two compression spring member each inserted in one of the apertured lugs and interposed between a pair of the friction rollers to hold the rollers normally in contact with the diamond-shaped cam and the friction cup to lock the rotating member and the rotatable member in fixed relation, and means for moving either pair of diagonally opposite rollers out of locking position and oscillating the rotatable member with relation to the rotating member comprising a handle, and four studs protruding therefrom of smaller diameter than the bores of the friction rollers and disposed within the bores of the friction rollers.

In testimony whereof I have signed my name to this specification, in the presence of two subscribing witnesses, on this 15th day of April A. D. 1913.

THOMAS F. MULLIGAN.

Witnesses:
W. H. WALKER,
THOS. W. LITTLEWOOD.

Copies of this patent may be obtained for five cents each, by addressing the "Commissioner of Patents, Washington, D. C."